July 5, 1927.
G. H. GIBSON
1,634,776
DEAERATING WATER
Filed Sept. 18, 1920
2 Sheets-Sheet 2
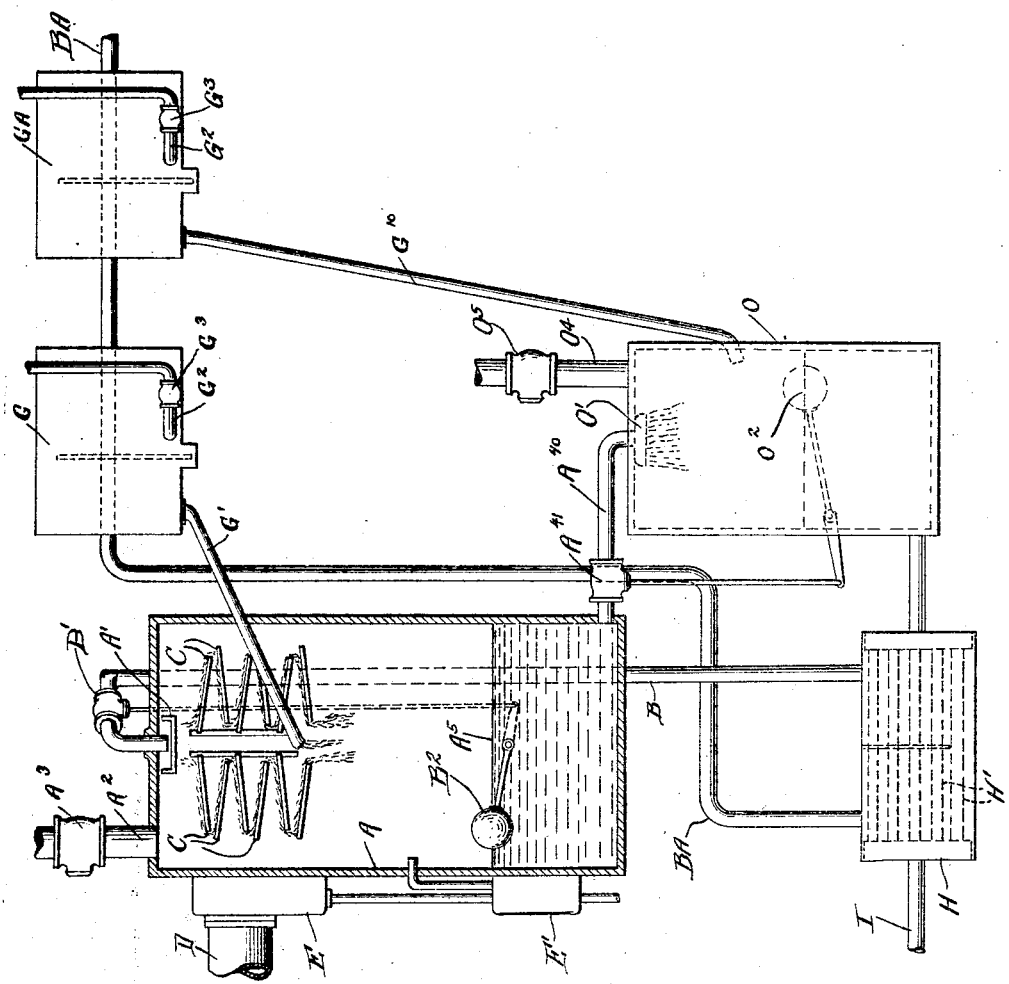

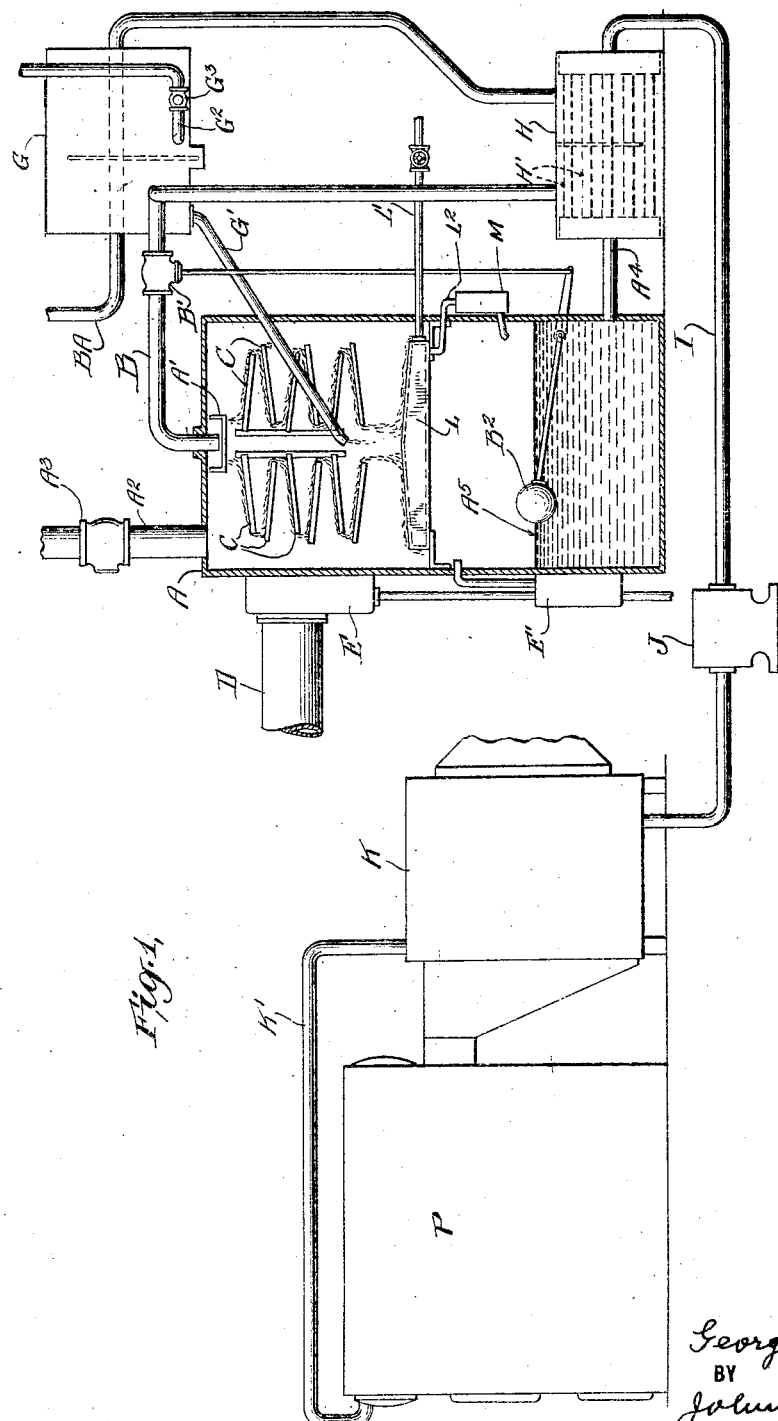

Patented July 5, 1927.

1,634,776

UNITED STATES PATENT OFFICE.

GEORGE H. GIBSON, OF MONTCLAIR, NEW JERSEY, ASSIGNOR TO COCHRANE CORPORATION, OF PHILADELPHIA, PENNSYLVANIA, A CORPORATION OF PENNSYLVANIA.

DEAERATING WATER.

Application filed September 18, 1920. Serial No. 411,232.

The general object of the present invention is to provide a simple and effective method of and apparatus for heating water and freeing it from air dissolved in it. The invention was primarily devised for use in preheating boiler feed water where the water is heated in part by being passed through an economizer or water heater receiving heat from the flue gases issuing from the boiler furnace. The primary purpose of removing the air dissolved in the water is to reduce the corrosive effect of the water, which is especially deleterious when, as is frequently desirable, the tubes of the economizer are made of steel.

In a preferred mode of carrying out the invention, the air is removed from the water by passing the water through an ordinary feed water heater operated so as to heat the water passing through it to a temperature in the neighborhood of and preferably slightly above 212°. Suitable provisions are made for discharging the liberated air without permitting the escape of appreciable quantities of steam from the heater. The water discharged from the heater at a temperature of 212° or above is too hot to be passed into the economizer if the most effective use of the latter is desired. To cool the water down before passing it to the economizer and thereby increase the economizer efficiency while at the same time avoiding any waste of heat, I provide a heat exchanger in the path of the water from the open feed water heater to the economizer, and utilize this heat exchanger as a means for preliminarily heating the cold water which also traverses the heat exchanger in passing to the open feed water heater. The heat thus imparted to the water entering the feed water heater reduces the amount of steam which must be utilized in the heater.

In a modified mode of carrying out the invention, I heat the water in the open feed water heater somewhat higher than in the mode first described by maintaining a steam pressure in the steam space of the heater a few pounds above that of the atmosphere and pass the water from the heater into a spray chamber in which a pressure approximately that of the atmosphere is maintained. In carrying out the invention in this manner I make provisions for discharging liberated air both from the open feed water heater and from the spray chamber. From the spray chamber the air freed water may be passed to a heat exchanger and thence to an economizer, as in the mode of operation first described.

The various features of novelty which characterize my invention are pointed out in particularity in the claims annexed to and forming a part of this specification. For a better understanding of my invention, however, and the advantages possessed by it, reference should be had to the accompanying drawings and descriptive matter in which I have illustrated and described preferred embodiments of my invention.

Of the drawings:

Fig. 1 is a somewhat diagrammatic representation of a boiler plant comprising a preferred form of apparatus for use in carrying out the first above described mode of operation; and Fig. 2 is a diagrammatic representation of apparatus for carrying out the second above described mode of operation.

In the drawings and referring first to the construction shown in Fig. 1, A represents an open feed water heater provided at its upper end with a trough $A^1$ receiving the water to be heated which is supplied by a pipe B. The water overflowing from the trough $A^1$ falls on to splash trays or baffles C. The supply of water to the heater is regulated by valve $B^1$ in the supply pipe B which is controlled by a float $B^2$ so as to maintain the water level in the heating chamber approximately at the level of the line $A^5$. $A^2$ represents a vent pipe from the heater, and $A^3$ a back pressure valve therein, set to open and permit the escape of excess steam when the pressure in the heater exceeds the predetermined maximum pressure desired. D represents an exhaust steam supply pipe through which exhaust steam passes into the heating chamber through the usual oil and water separator E, the drip from which passes into a discharge trap $E^1$, which may also serve to take the overflow of water from the heater when the water level rises too high in the heater. In so far as above described the open feed water heater shown is of well known type.

In accordance with the present invention I preferably employ an auxiliary heating device L in the heating chamber and onto which the water from the trays E splashes and over which it flows in film-like streams.

As shown this auxiliary heater is in the form of a hollow tray or box, preferably formed with sloping sides, and receiving live steam or exhaust steam at a pressure above that in the steam space of the heater, through a supply pipe $L^1$. Water of condensation forming in the heater L may be withdrawn from the latter and passed into the heater A by the drain pipe $L^2$ and a suitable steam trap M. The air liberated from the water in the heater passes out of the latter through the inclined pipe $G^1$ into a cooler G, which, as shown, is in the form of a drum surrounding the cold water supply pipe BA. The drum G is provided with an air outlet $G^2$, flow through which is controlled by an automatic air valve $G^3$, which may well be of the sylphon or other known thermostatic type and which permits the escape of the air but prevents the escape of steam.

The water flowing to the heater through the pipe B is passed through a heat exchanger H which is also traversed by the water leaving the heater through the outlet $A^4$. As shown this heat exchanger is of the tubular type with the pipe B forming the outlet from the inter-tube space of the heat exchanger. Water is supplied to the inter-tube space by the cold water supply pipe BA. The water entering the heat exchanger from the heater outlet $A^4$, flows through the tubes $H^1$ of the heat exchanger and then passes through pipe I and pump J to the economizer K, and after being heated in the latter, is passed into the boiler P through the economizer water outlet $K^1$.

The exact temperatures prevailing in different portions of the apparatus shown may vary of course with the conditions of use, but I will say by way of example that in a typical plant the apparatus may well be so proportioned and operated that with the water passing to the air cooler G through the cold water supply pipe BA at 60° F., the temperature of the water leaving the cooler and passing from it to the heat exchanger H will be 70° F., the temperature of the water leaving the heater through the outlet $A^4$ will be 215° F., and the temperature of water passing from the heat exchanger to the economizer K will be 150° F.

In such a plant as that just described, the pressure in the steam space of the heater A will be of course, approximately the pressure of saturated steam at the water discharge temperature of 215°. In practice but a small amount of the heat imparted to the water in its passage through the heater A will be derived from the auxiliary heater L, the primary function of which is merely to subject the water flowing over it to an energetic boiling action with a consequent liberation of air still contained in the water. On account of the relatively large surface of the heating device and the film-like condition of the water flowing over it, this boiling action can be obtained with a relatively small expenditure of heat. In normal operation the air and other gases liberated from the water in the heater, flow through the outlet $G^1$ into the cooler G which serves as a condenser for condensing the steam mixed with the entering air and gases. The resultant water of condensation is preferably returned to the heater and, in the arrangement shown, may flow back into the heater through the inclined pipe connection $G^1$. Advantageously this connection $G^1$ is arranged to cause the water to flow over some of the lower trays C of the heater A.

With the apparatus of Fig. 1 it is possible to reduce the air or air and carbon dioxide content in the water leaving the heater A to an amount not exceeding .2 cubic centimeter per liter, although the water entering the heater may and frequently will, in practice, contain as much as 30 cubic centimeters per liter, and the water may contain impurities which will result in the liberation of considerable quantities of carbon dioxide from the water as it passes through the heater. Water does not have a troublesome corrosive effect because of air dissolved in it, unless the air is present in amounts greater than .2 cubic centimeter per liter.

The modified form of apparatus shown in Fig. 2 differs from that shown in Fig. 1 primarily in the insertion of a spray chamber O between the water outlet from the heater A and the heat exchanger H, in the provision of a cooler GA similar to the cooler G and cooled by the water passing through the pipe B to the heater A, and in the omission of the heater L. The cooler GA is connected by a pipe $G^{10}$ to the spray tank O and serves like the connection $G^1$ to the cooler G as a conduit for passing air and water vapor into the cooler GA from the spray chamber O, and for returning water condensation to the latter. The water passes from the heater A into the upper end of the spray chamber O through a pipe $A^{40}$ connected within the spray chamber O to a spray head or rose $O^1$. The height of water level in the spray chamber O is regulated by a float $O^2$ controlling a valve $A^{41}$ in the water conduit $A^{40}$. The spray chamber O is provided with a pressure limiting vent connection $O^4$ provided with a back pressure valve $O^5$ set to open when the pressure in the spray chamber O reaches a desired maximum therein which is ordinarily about that of the atmosphere.

In the operation of the apparatus shown in Fig. 2, the back pressure valve $A^3$ should be set, and the steam supply to the heater A so regulated that a pressure a few pounds above that of the atmosphere is maintained in the steam space of the heater A. In consequence the water passing into the spray chamber A will be at a temperature corresponding to the steam pressure in the heater A, say at 220° F. if the back pressure in the heater A is about three pounds. The apparatus is operated to maintain a steam pressure in the spray chamber O approximately that of the atmosphere, and in consequence as the water is sprayed into the steam space of the chamber O there is an appreciable generation of steam and a liberation of practically all air and gas not liberated from the water in the heater A. The air thus liberated in the chamber O passes into the cooler GA and is discharged from the latter through the air valve $G^3$ in the outlet $G^2$. The heat of evaporation contained in the steam passing into the cooler GA through the connection $G^{10}$ is used in heating up the water passing through the pipe B.

It will be obvious to those skilled in the art that the methods of operation, and the apparatus required for carrying out the operations described are simple and effective and do not require special skill or care on the part of the attendant. The invention is well adapted for use in handling relatively large quantities of water, and is economical in the consumption of heat, practically no heat being lost in the operation except such as results from radiation losses which, with properly constructed and arranged apparatus, will be small.

The deaeration of the water is effected by the consumption of a relatively and desirably small amount of steam, which, especially in many modern plants in which the supply of available exhaust steam is restricted, is desirable to avoid lowering the plant efficiency. With the type of apparatus shown in Fig. 2 it is possible, though I do not consider it generally desirable, to omit the cooler G and release all the air in the spray chamber O.

While in accordance with the provisions of the statutes I have illustrated and described the best form of my invention now known to me, it will be apparent to those skilled in the art that changes may be made in the form of the method and apparatus described without departing from the spirit of my invention as set forth in the annexed claims.

Having now described my invention, what I claim as new and desire to secure by Letters Patent, is:

1. The continuous method of treating air-containing water which consists in heating the water to a temperature above 212° F. to liberate air from the water and then cooling the water to a temperature substantially below 212° F. by transferring heat from it to the air-containing water being heated.

2. The method of efficiently utilizing an economizer in preheating boiler feed water containing air which consists in first heating the water to a temperature above 212° F. and then cooling the water to a temperature substantially below 212° F. by transferring heat from the hot air freed water to the water being heated and passing the cooled air freed water into the economizer.

3. Water heating and treating apparatus comprising in combination an open water heater, provided with an outlet for the escape of air, and means for passing water into and withdrawing it from said heater including a heat exchanger in which heat is transferred from the water withdrawn from the heater to the water passing into the heater.

4. Water heating and treating apparatus comprising in combination an open water heater, a cooler provided with an air outlet, a heat exchanger, connections for passing air and vapor to the cooler from the heater and for returning water of condensation to the latter, and connections for passing the water to be heated successively through the cooler, heat exchanger, heater and back through the heat exchanger.

5. Apparatus for removing gases from liquids comprising a vessel having an upper part constituting a direct contact condenser and a lower part constituting a surface heater, means for introducing the liquid to be heated into the upper part, means for causing said liquid to fall in a shower from the upper part on to the heated surface, said means extending from one side of the vessel to the other, and an outlet for air in the upper part, whereby the incoming liquid operates by direct contact to condense liquid vapor rising with the air from the heated surface and permits the air to pass off to the air outlet.

6. A process of deaerating water which consists in dropping the water to be deaerated on a surface heated to a temperature sufficiently higher than said water to liberate the gases and causing said gases to pass through the dropping water to remove any water vapor in the gases, and thereafter removing the gases.

7. Apparatus for removing gases from liquids comprising a vessel having an upper part constituting a direct contact condenser and a lower part constituting a surface heater, means for introducing the liquid to be heated into the upper part, means for causing said liquid to fall in a shower from the upper part on to the heated surface, said means extending from one side of the vessel to the other, an outlet for air in the upper part, whereby the incoming liquid operates by direct contact to condense liquid vapor rising with the air from the heated surface and permits the air to pass off to the air outlet, and means for supplying steam to the upper part of said vessel at a temperature intermediate the temperature of the liquid introduced and the temperature of the heated surface.

8. Apparatus for the removal of gases from liquids comprising a vessel, means for introducing liquid into the vessel in a falling shower, an exposed heating surface within said vessel sufficient to effect ebullition of the liquid at the temperature and pressure existing in the vessel, said surface being arranged beneath the falling shower and upon which surface the liquid is showered and is ebullated, and a connection to the vessel for the introduction of a heating medium from an outside source into direct contact with the liquid falling through the vessel.

9. Apparatus for the removal of gases from liquids, comprising a vessel, means for introducing liquid into said vessel, in a falling shower, an exposed steam heated surface within said vessel, said surface being arranged beneath the falling shower and sufficient to effect ebullition of the liquid at the temperature and pressure existing in the vessel upon which surface said liquid is showered and is ebullated, and a connection to the vessel for the introduction of steam from an outside source into direct contact with the liquid falling through the vessel.

10. Apparatus for the removal of gases from liquids comprising a vessel, a heating surface within said vessel sufficient to effect ebullition of the liquid at the temperature existing in the vessel, means for causing the liquid to fall in a divided condition on to said surface and a connection to the vessel for the introduction of a heating medium from an outside source into direct contact with the liquid within the vessel.

11. Apparatus for the removal of gases from liquids comprising a vessel, a steam heated surface within said vessel sufficient to effect ebullition of the liquid at the temperature existing in the vessel, means for causing the liquid to fall in a divided condition on to said surface and a connection to the vessel for the introduction of steam from an outside source into direct contact with the liquid within the vessel.

12. Apparatus for the removal of gases from liquids comprising a vessel, a steam heated surface within said vessel sufficient to effect ebullition of the liquid at the temperature existing in the vessel, means for causing the liquid to fall in a divided condition on to said surface and a connection to the vessel for the introduction of steam from an outside source into direct contact with the falling liquid within the vessel.

Signed at New York, in the county of New York and State of New York, this 14th day of September, A. D. 1920.

GEORGE H. GIBSON.